United States Patent
Bömer et al.

(10) Patent No.: US 7,142,584 B1
(45) Date of Patent: Nov. 28, 2006

(54) SYNCHRONIZING A BASH STATION AND A MOBILE STATION

(75) Inventors: Leopold Bömer, San Diego, CA (US); Jürgen Michel, München (DE); Andreas Lobinger, Miesbach (DE); Bernhard Raaf, München (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/786,738

(22) PCT Filed: Sep. 2, 1999

(86) PCT No.: PCT/DE99/02779

§ 371 (c)(1),
(2), (4) Date: Jun. 29, 2001

(87) PCT Pub. No.: WO00/14915

PCT Pub. Date: Mar. 16, 2000

(30) Foreign Application Priority Data

Sep. 8, 1998 (DE) ................. 198 40 974
Feb. 19, 1999 (DE) ................. 199 07 083

(51) Int. Cl.
H04B 1/69 (2006.01)
H04B 1/707 (2006.01)
H04B 1/713 (2006.01)

(52) U.S. Cl. .............. 375/145; 375/142; 375/146; 375/149; 375/140; 375/150; 375/343

(58) Field of Classification Search ........... 375/140, 375/145, 149–150, 143, 362, 364, 366–368, 375/343, 142, 146; 708/422–426; 370/509, 370/512, 514, 515
See application file for complete search history.

(56) References Cited

U.S. PATENT DOCUMENTS 5,559,829 A 9/1996 Le Strat et al.

(Continued)

FOREIGN PATENT DOCUMENTS

DE 43 18 368 5/1993
WO 96/39749 12/1996

OTHER PUBLICATIONS

Maskara et al., "Concatenated Sequences for Spread Spectrum Systems," IEEE Transaction on Aerospace and Electronic Systems, US, IEEE, Inc. New York, Bd. AES-17, Nr. 3, Mai 1981.

(Continued)

*Primary Examiner*—Phuong Phu
(74) *Attorney, Agent, or Firm*—Fish & Richardson P.C.

(57) ABSTRACT

A method for synchronizing a base station to a mobile station includes transmitting a signal sequence K(i) of length n from the base station to the mobile station. The signal sequence K(i) is formed by repeating a second signal sequence element K2(k) of length n2 n1 times. The second signal sequence is modulated with a first signal sequence element K1(j) of length n1. In the method, n1 is equal to n2 and i, j and k are integers.

12 Claims, 10 Drawing Sheets

U.S. PATENT DOCUMENTS

| | | | |
|---|---|---|---|
| 5,727,018 | A | 3/1998 | Wolf et al. |
| 6,226,315 | B1 * | 5/2001 | Sriram et al. ............... 375/140 |
| 6,278,699 | B1 * | 8/2001 | Atarius ........................ 370/324 |
| 6,385,232 | B1 * | 5/2002 | Terashima ................... 375/149 |
| 6,535,548 | B1 * | 3/2003 | King ........................... 375/150 |

OTHER PUBLICATIONS

Internatonaler Vorlaufiger Prugunfsnericht—Beiblatt (Internatilnational Provisional Examination Supplement PCT/US/02779).

Milstein L.B., "Some statistical properties of combinations sequences," IEEE Transactions on Information Theory, Mar. 1977, US, Bd. IT-23, Nr. 2, pp. 254-258, XP000877014 ISSN:0018-9448.

NN: "UMTS; Physical Channel Structure" ETSI TR 101 397; UMTS 20.04 Version 3.0.1, Oct. 1998, Seiten 33-38, XP002131576 Nizza, FR.

International Search Report for PCT Application No. PCT/DE99/02779, dated Feb. 25, 2000, 10 pages.

* cited by examiner

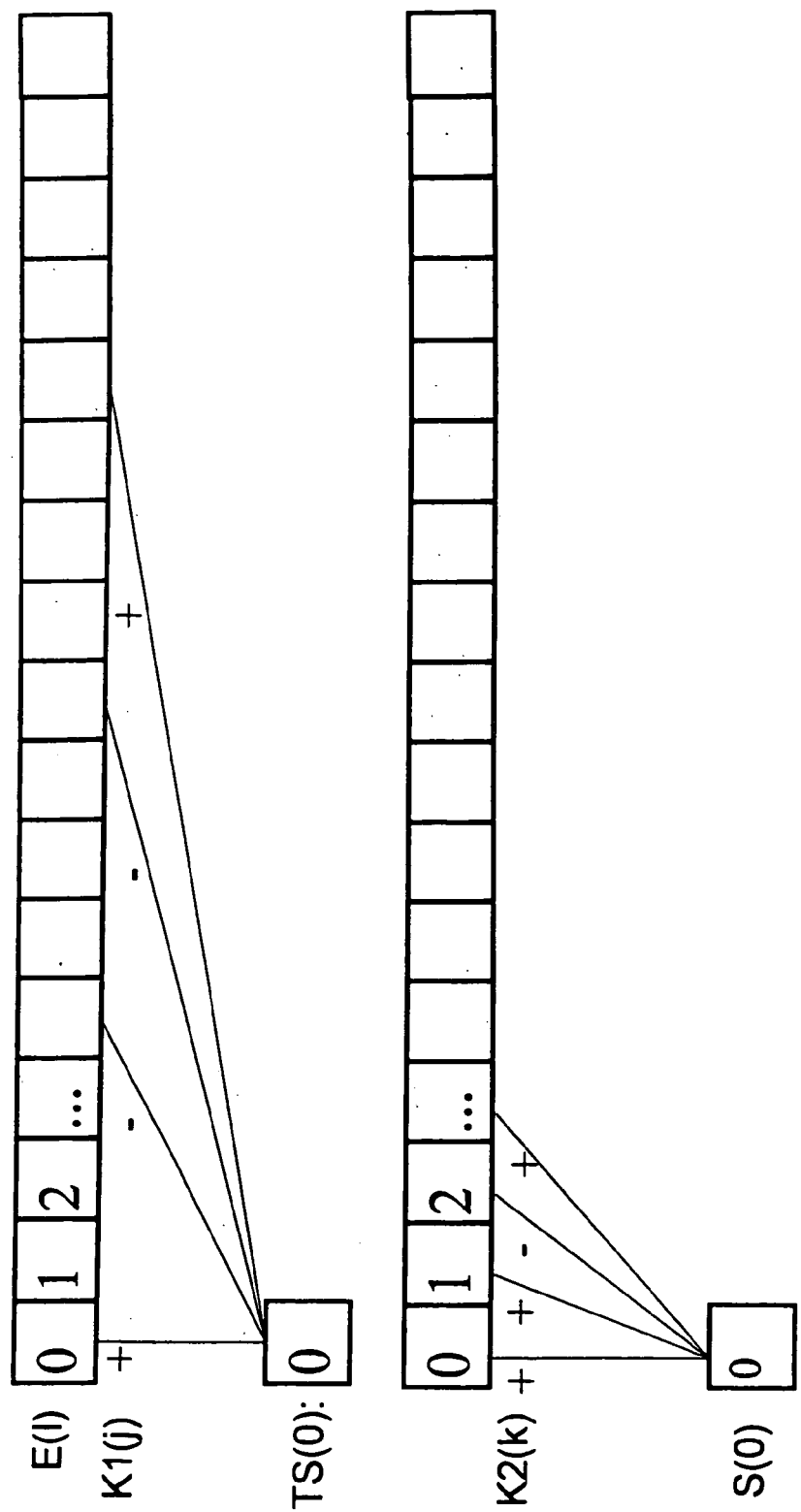

SYNCHRONIZING A BASH STATION AND A MOBILE STATION

BACKGROUND

1. Field of the Invention

The invention relates to a method for forming a signal sequence which is to be transmitted in particular for the purpose of synchronization of at least two transmission units, and to a method for determining this signal sequence, and corresponding transmitting and receiving units.

2. Description of the Related Art

In signal transmission systems, such as mobile radio systems, it is necessary for one of the communication partners (a first transmission unit) to identify specific defined signals which are transmitted by another communication partner (second transmission unit). These may be, for example, so-called synchronization bursts (synchronization radio blocks) for synchronization of two synchronization partners, such as radio stations, or may be so-called access bursts.

In order to detect and to identify such received signals reliably against the background noise, it is known for the received signal to be continuously correlated with a predetermined signal sequence for a defined period of time, and for the correlation sum to be formed over the time period of the predetermined signal sequence. That region of the received signal which produces a maximum correlation sum corresponds to the sought signal. The synchronization signal from the base station in a digital mobile radio system is preceded, for example, by a signal sequence as a so-called training sequence, which is detected or determined in the manner just described in the mobile station, by correlation with the stored signal sequence. The mobile stations can thus be synchronized to the base station.

Correlation calculations of such a type are also required in the base station, for example for Random Access CHannel (RACH) detection. Furthermore, a correlation calculation is also carried out in order to establish the channel impulse response and the signal delay times of received signal bursts.

The correlation sum is in this case calculated as follows:

$$Sm = \sum_{i=0}^{n-1} E(i+m) * K(i)$$

where E(i) is a received signal sequence derived from the received signal and K(i) is the predetermined signal sequence, with i running from 0 to n−1. The correlation sum Sm is calculated successively for a number of signal sequences E(i) at different times and obtained from the received signal, and the maximum value of Sm is then established. If k successive correlation sums are calculated, then the calculation effort comprises k*n operations, with a multiplication and addition together being counted as one operation.

The calculation of the correlation sums is thus highly complex and, particularly for real-time applications such as voice communication or video telephony, or in CDMA systems, requires powerful and thus expensive processors, which consume a large amount of power during the calculation process. For example, a known signal sequence of length 256 chips (in CDMA, a transmitted bit is also referred to as a chip) has to be determined for synchronization of the UMTS mobile radio system, which is currently being standardized. The sequence is repeated every 2560 chips. Since the mobile station is initially operating asynchronously with respect to the chip clock, the received signal must be oversampled to ensure that an adequate signal is still obtained even if the sampling position is poor. Owing to the sampling of the I and Q components, this leads to 256*2560*2*2=2621440 operations.

SUMMARY

The invention is also based on the object of specifying methods and arrangements which allow signal sequences to be formed, and thus allow signal sequences to be specified, which can be determined easily in transmitted received signal sequences. The invention is also based on the object of specifying a method and arrangements which allow these signal sequences to be determined comparatively easily by the formation of correlation sums.

The object is achieved by the features in the independent patent claims. Developments can be found in the dependent claims.

The invention is based on the idea of forming signal sequences by repeating a second signal sequence element of length n2 n1 times and, in the process, modulating it with the first signal sequence element.

This allows signal sequences to be formed which, if they are contained in a received signal sequence, can be determined easily.

Specification of the method for forming signal sequences means that signal sequences which can be formed or are obtained by means of such a method are also within the scope of the invention. In particular, this also includes their use in data transmission systems, especially for the purpose of synchronization of a mobile station to a base station.

In order to determine a predetermined signal sequence, which is contained in a received signal sequence, by establishing correlation sums, a partial correlation sum sequence of the second signal sequence element is calculated with corresponding parts of the received signal sequence. In order to calculate a correlation sum, n1 elements of the partial correlation sum sequence are selected and are multiplied by the first signal sequence element, in the sense of a scalar product.

In a development of the invention, once partial correlation sums have been calculated they are stored and are used to calculate further calculation sums.

Thus, when calculating further correlation sums, it is possible to use partial correlation sums which have already been calculated in advance, and thus to reduce the computation complexity enormously.

The term received signal sequence also means a signal sequence which has been derived from a received signal for example by demodulation, filtering, derotation, scaling or analog-digital conversion.

The invention will be described in more detail in the following text with reference to various exemplary embodiments, whose explanation makes reference to the figures listed below, in which:

BRIEF DESCRIPTION OF THE DRAWINGS

FIG. 4 shows an illustration of signal sequences and signal sequence elements according to the invention, FIGS. 6, 7 and 8 show schematic illustrations of a method for calculating a correlation sum, FIGS. 9 and 10 show schematic illustrations of one embodiment variant of a method for forming the correlation sum.

DETAILED DESCRIPTION

Figure 1:
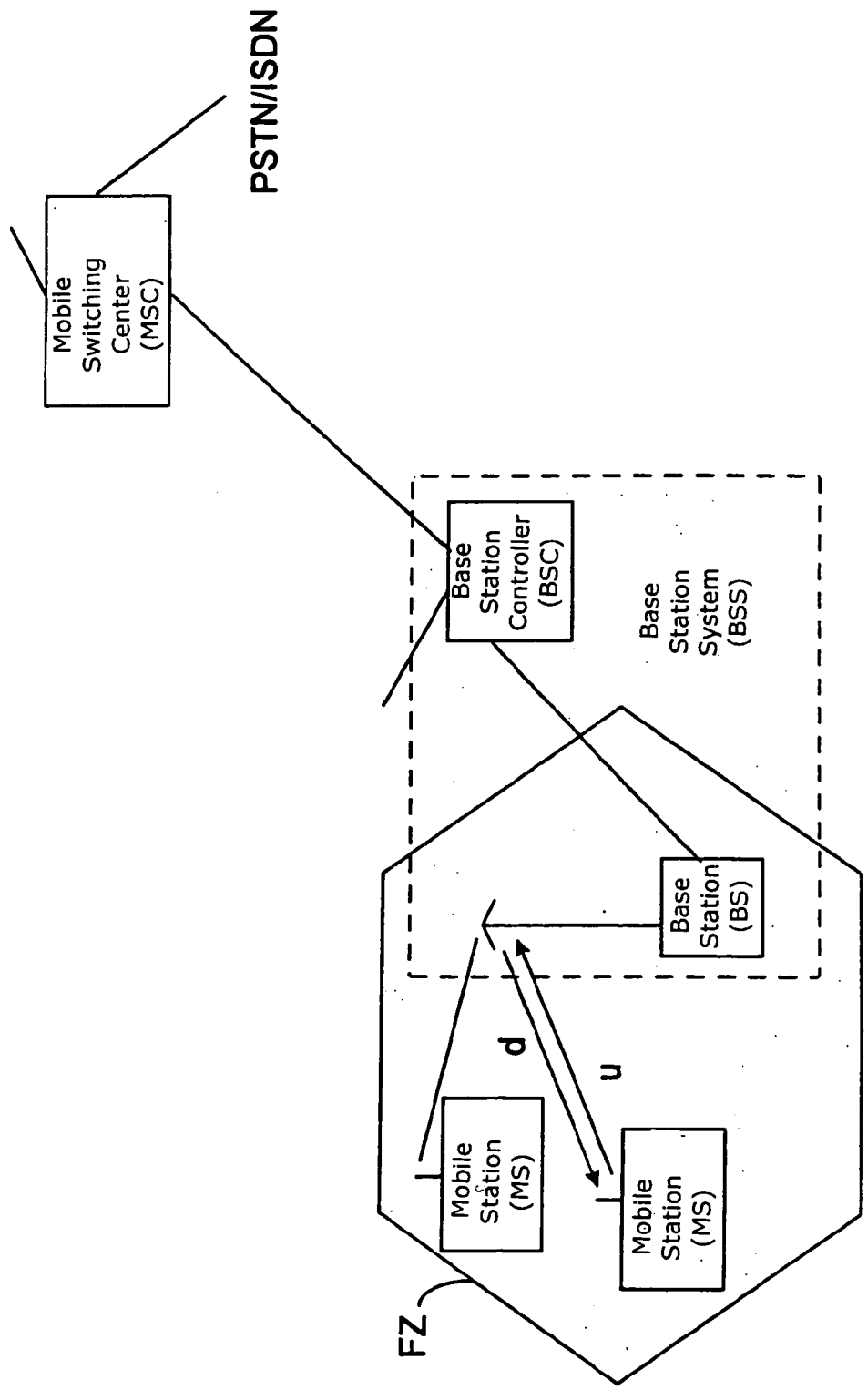
FIG. 1 shows a schematic illustration of a mobile radio network.

FIG. 1 shows a cellular mobile radio network, such as the GSM (Global System for Mobile Communication) system which comprises a large number of mobile switching centers MSC which are networked with one another and produce access to a landline network PSTN/ISDN. Furthermore, these mobile switching centers MSC are each connected to at least one base station controller BSC, which can also be formed by a data processing system. A similar architecture is also used in a UMTS (Universal Mobile Telecommunication System).

Each base station controller BSC is in turn connected to at least one base station BS. A base station BS such as this is a radio station which can set up a radio link via a radio interface to other radio stations, so-called mobile stations MS. Information can be transmitted within radio channels f, which are within frequency bands b, by means of radio signals between the mobile stations MS and the base station BS associated with these mobile stations MS. The range of the radio signals of a base station essentially defines a radio cell FZ.

Base stations BS and a base station controller BSC can be combined to form a base station system BSS. The base station system BSS is in this case also responsible for radio channel administration and assignment, data rate matching, monitoring of the radio transmission path, handover procedures and, in the case of a CDMA system, for allocation of the spread code set to be used, and transmits the signaling information required for this purpose to the mobile stations MS.

In the case of a duplex system, the frequency bands which are provided in FDD (Frequency Division Duplex) systems such as the GSM system for the uplink u (mobile station (transmitting unit) to the base station (receiving unit)) may be different to those provided for the downlink d (base station (transmitting unit) to the mobile station (receiving unit)). Within the different frequency bands b, a number of frequency channels f can be provided by means of an FDMA (Frequency Division Multiple Access) method.

In the context of the present application, the term transmission unit also means a communication unit, transmitting unit, receiving unit, communications terminal, radio station, mobile station or base station. Terminology and examples which are used in the course of this application often also relate to a GSM mobile radio system; however, they are in no way limited to this system and, on the basis of the description, can also equally be applied by a person skilled in the art to other mobile radio systems, possibly future mobile radio systems, such as CDMA systems and, in particular, wideband CDMA systems.

Multiple access methods allow data to be transmitted efficiently via a radio interface, to be separated and to be allocated to one or more specific links and to the appropriate subscriber. A time division multiple access method TDMA, a frequency division multiple access method FDMA, a code division multiple access method COMA or a combination of a number of these multiple access methods can be used for this purpose.

In the case of FDMA, the frequency band b is subdivided into a number of frequency channels f; these frequency channels are split into timeslots ts by the time-division multiple access method TDMA. The signals transmitted within a timeslot TS and a frequency channel f can be separated by connection-specific spread codes, so-called CDMA codes cc, which are modulated onto the data.

The physical channels produced in this way are allocated to logical channels in accordance with a specified scheme. A fundamental distinction can be drawn between two types of logical channel: signaling channels (or control channels) for transmitting signaling information (or control information), and traffic channels (TCH) for transmitting user data.

The signaling channels are further subdivided into:
Broadcast Channels
Common Control Channels
Dedicated/Access Control Channel DCCH/ACCH)

The group of Broadcast Channels includes the Broadcast Control Channel BCCH by means of which the MS receives radio information from the Base Station System BSS, the Frequency Correction Channel FCCH and the Synchronization Channel SCH. The Common Control Channels include the Random Access Channel RACH. The radio blocks or signal sequences which are transmitted to provide these logical channels can in this case contain signal sequences K(i), so-called correlation sequences, for various purposes, and signal sequences K(i) can be transmitted on these logical channels for various purposes.

By way of example, a method for synchronization of a mobile station MS to a base station BS will be explained in the following text: during a first step of the initial base station search or cell search (initial cell search procedure), the mobile station uses the primary synchronization channel (SCH(PSC)) in order to achieve timeslot synchronization with the strongest base station. This can be ensured by a matched filter or an appropriate circuit which is matched to the primary synchronization code cp but is transmitted by all the base stations. In this case, the same primary synchronization code cp, of length 256, is transmitted by all the base stations BS.

The mobile station determines, by means of correlation from a received sequence, the received signal sequences K(i) on the basis of a principle which is explained in FIGS. 6 to 11 and the associated description. In this case, peaks are emitted at the output of a matched filter for each received signal sequence of each base station which is located within the reception area of the mobile station. The detection of the position of the strongest peak makes it possible to determine the timing of the strongest base station modulo the slot length. In order to ensure greater reliability, the output from the matched filter can be accumulated non-coherently over the number of timeslots. The mobile station thus carries out a correlation over a signal sequence of length 256 chips as a matched filter operation.

Figure 5:
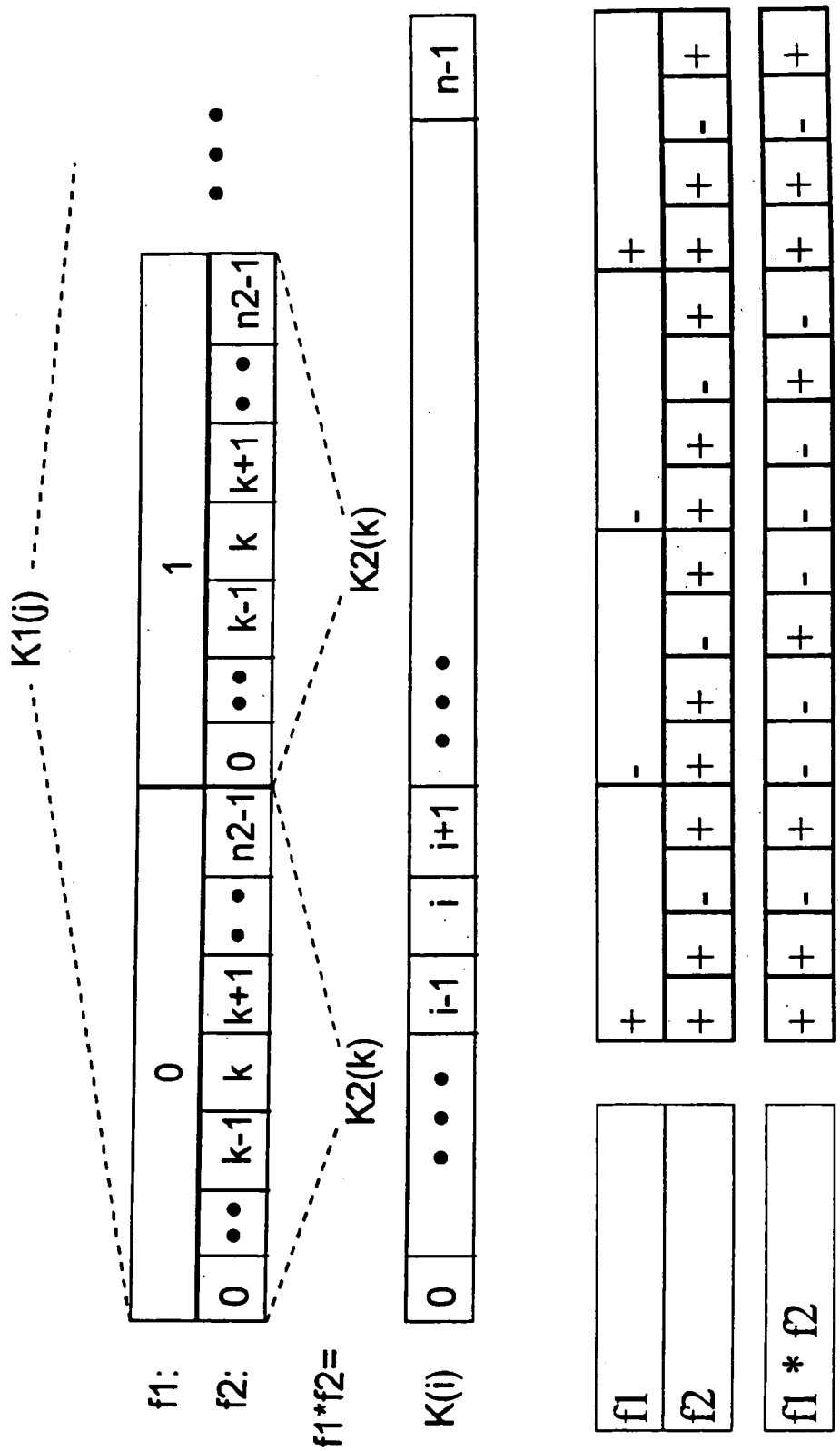
FIG. 5 shows a schematic illustration of the formation of the signal sequence according to the invention.

The synchronization code cp is in this case formed, or can be formed or is obtained in such a way, corresponding to a signal sequence K(i) based on a principle which is explained in FIG. 5 and the associated description. The signal sequence K(i) or the synchronization code cp of length 256 is in this case formed, or can be formed in such a way, from two signal sequence elements K1($j$), K2($k$), which each have a length of 16. These signal sequence elements in this case form a signal sequence element pair (K1($j$); K2($k$)).

A signal sequence K(i) which is obtained in such a manner can in this case also be referred to as a "hierarchical signal sequence". A signal sequence element can also be referred to as "short correlation sequence".

Figure 2:
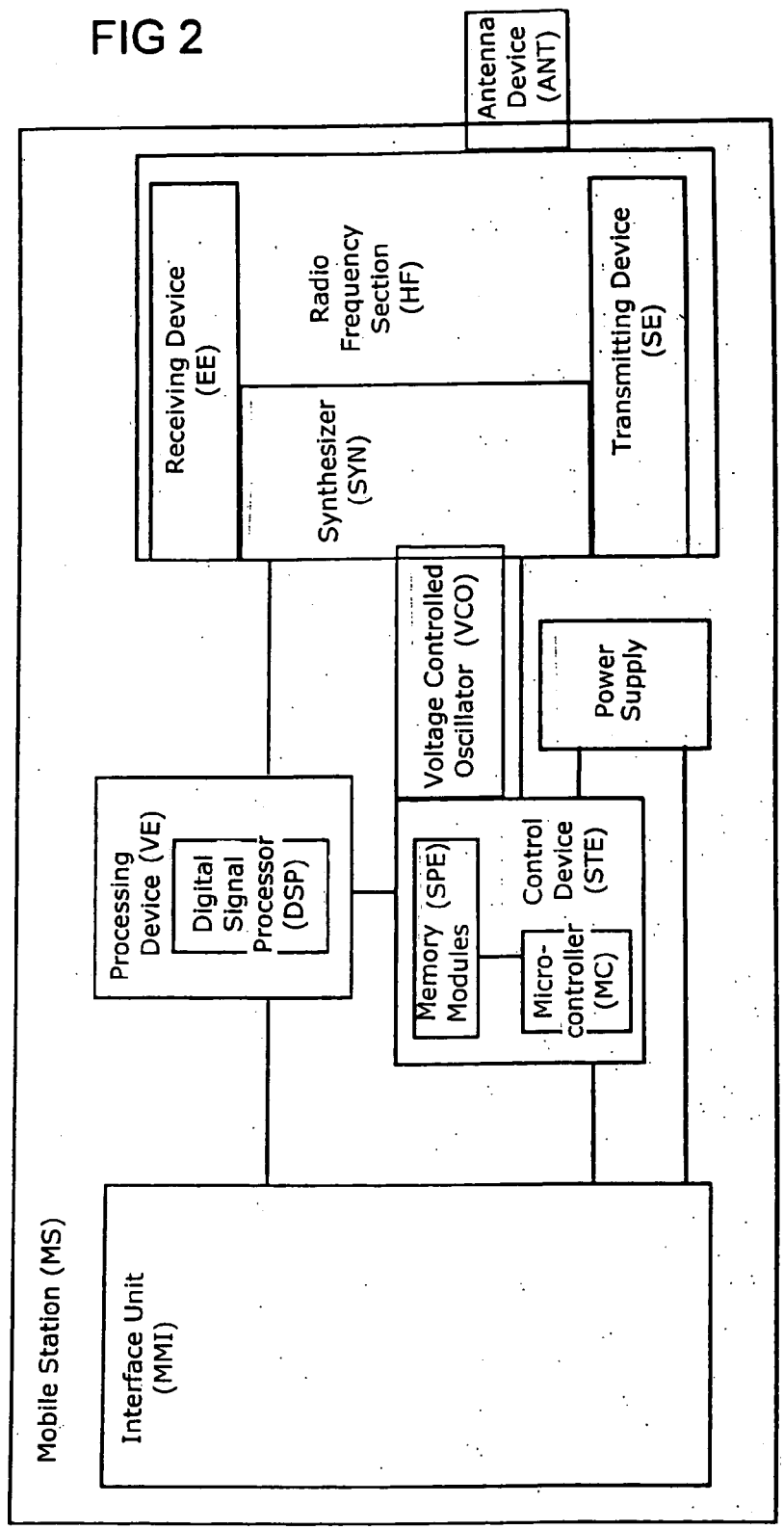
FIG. 2 shows a block diagram of a radio station.

FIG. 2 shows a radio station, which may be a mobile station MS, comprising a control unit or interface unit MMI, a control device STE, a processing device VE, a power supply device SE, a receiving device EE and, possibly, a transmitting device SE.

The control device STE essentially comprises a programmable microcontroller MC which can access memory modules SPE for writing and reading. The microcontroller MC controls and monitors all the major elements and functions of the radio station.

The processing device VE may also be formed by a digital signal processor DSP, which can likewise access memory modules SPE. The processing device VE can also provide addition and multiplication means.

The program data which are required for controlling the radio station and the communication sequence, in particular the signaling procedures as well, and information obtained during the processing of signals are stored in the volatile or non-volatile memory modules (SPE). In addition, signal sequences K(i) which are used for correlation purposes, and intermediate results from correlation sum calculations, can be stored in these memory modules SPE. The signal sequences K(i) which are within the scope of the invention may thus be stored in the mobile station and/or in the base station.

It is also possible for one or more signal sequence elements of signal sequence element pairs (K1(j); K2(k)) to be stored in the mobile station and/or in the base station. It is also possible for a signal sequence K(i) to be formed from a signal sequence element par (K1(j); K2(k)) in the mobile station and/or in the base station.

In particular, a signal sequence K(i) which is transmitted at fixed or variable intervals for synchronization purposes can be stored in a base station or in all the base stations in a system. The signal sequence element pair (K1(j); K2(k)) from which the signal sequence K(i) which is stored in the base station can be formed is stored in the base station MS and is used for synchronization of the mobile station to a base station in order to carry out correlation sum calculations with little computation complexity.

The signal sequences and the signal sequence elements can also be stored by storing appropriate information in any desired coded form and by means for storage such as volatile and/or non-volatile memory modules, or by means of appropriately configured adder or multiplier inputs or corresponding equivalent hardware configurations.

The radio frequency section HF may comprise the transmitting device SE, with a modulator and an amplifier V, and a receiving device EE with a demodulator and, likewise, with an amplifier. The analog audio signals and the analog signals originating from the receiving device EE are converted into digital signals by analog/digital conversion, and are processed by the digital signal processor DSP. After processing, the digital signals may be converted by digital/analog conversion into analog audio signals or other output signals, and analog signals to be supplied to the transmitting device SE. Modulation and demodulation may be carried out for this purpose.

The transmitting device SE and the receiving device EE are supplier via the synthesizer SYN with the frequency from a voltage controlled oscillator VCO. The voltage controlled oscillator VCO also allows the system clock to be produced to provide the clock for the processor devices in the radio station.

An antenna device ANT is provided for receiving and transmitting signals via the air interface of a mobile radio system. In some known mobile radio systems, such as the GSM (Global System for Mobile Communication), the signals are received and transmitted pulsed with respect to time, in so-called bursts.

The radio station may also be a base station BS. In this case, the loudspeaker element and the microphone element of the control unit MMI are replaced by a link to a mobile radio network, for example via a base station controller BSC and/or a switching center MSC. In order to interchange data simultaneously with a number of mobile stations MS, the base station BS has an appropriately large number of transmitting and receiving devices.

Figure 3:
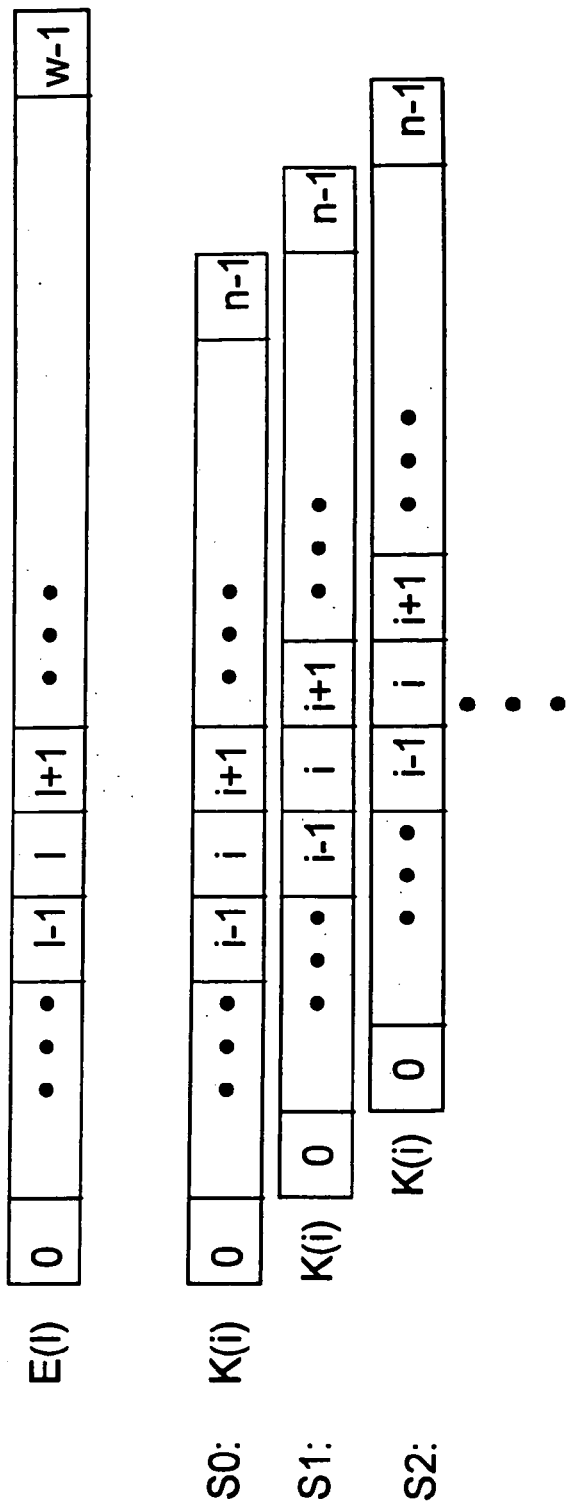
FIG. 3 shows a conventional method for calculating correlation sums.

FIG. 3 shows a received signal sequence E(l) which may be a signal sequence derived from a received signal and has a length w. In order to calculate a first correlation sum S0 in accordance with the formula quoted initially, elements in a first section of this received signal sequence E(l) are multiplied in pairs by the corresponding elements in the signal sequence K(i) which has a length n, and the length of the resultant result element are added up: to form the correlation sum S0.

In order to calculate a further correlation sum S1, the signal sequence K(i) is shifted by one element to the right, as illustrated in graphical form in the figure, and the elements in the signal sequence K(i) are multiplied in pairs by the corresponding elements in the signal sequence E(l), with the correlation sum S1 once again being formed by summation of the resultant result elements.

The multiplication of the elements in the signal sequence in pairs by corresponding elements in the received signal sequence and subsequent summation can also be describes vectorially as the formation of a scalar product, if the elements in the signal sequence and the elements in the received signal sequence are in each case combined to form a vector in a Cartesian coordinate system:

$$S0 = \begin{pmatrix} K(0) \\ \vdots \\ K(i) \\ \vdots \\ K(n-1) \end{pmatrix} * \begin{pmatrix} E(0) \\ \vdots \\ E(i) \\ \vdots \\ E(n-1) \end{pmatrix}$$

$$S1 = \begin{pmatrix} K(0) \\ \vdots \\ K(i) \\ \vdots \\ K(n-1) \end{pmatrix} * \begin{pmatrix} E(1) \\ \vdots \\ E(i+1) \\ \vdots \\ E(n) \end{pmatrix}$$

In the correlation sums S determined in this way, it is possible to search for the maximum, to compare the maximum of the correlation sums S with a predetermined threshold value, and in this way to determine whether the received signal E(l) contains the predetermined signal sequence K(i) and, if yes, where it is located in the received signal E(l), and thus to synchronize two radio stations to one another and to detect data onto which an individual spread code has been modulated in the form of a signal sequence K(i).

Figure 4:
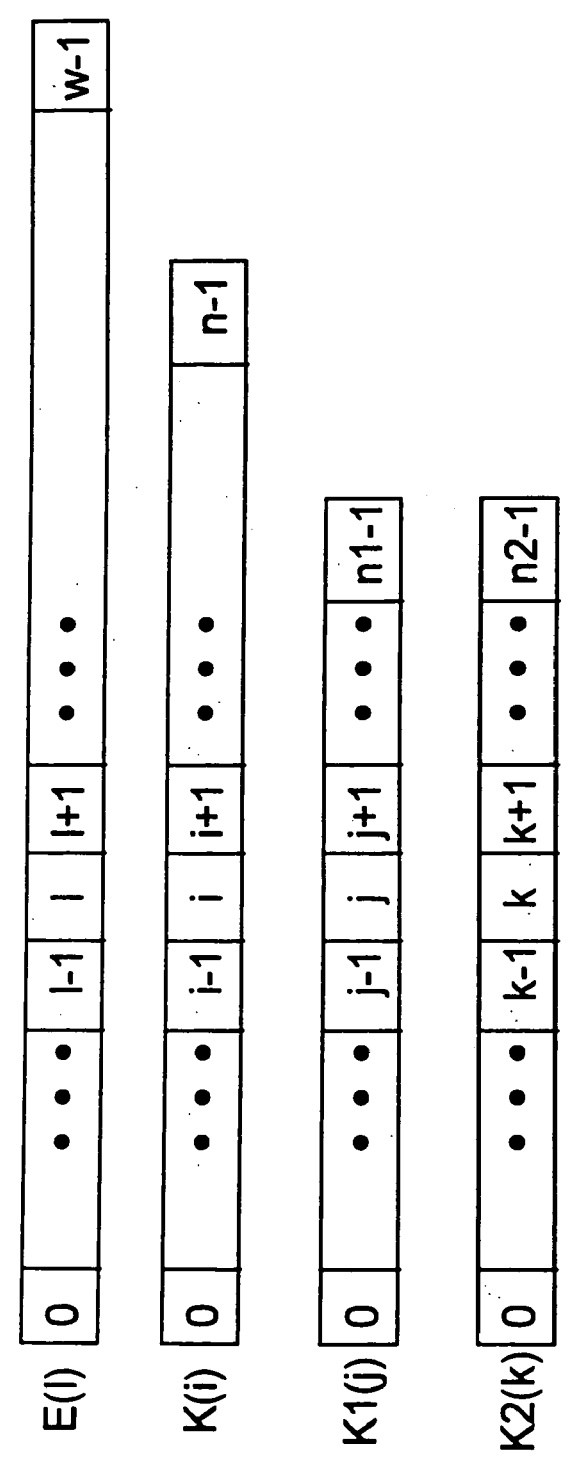

FIG. 4 once again shows the received signal sequence E(l) and, as a correlation sequence, a signal sequence K(i), which is based on the signal sequence elements K1(j), K2(k).

FIG. 5 shows the formation of a signal sequence K(i) which is based on two signal sequence elements K2(k) of length n2 and K1(j) of length n1. For this purpose, the signal sequence element K2(k) is repeated n1 times, with the signal sequence element K1(j) being modulated onto it in the process. The formation of the signal sequence K(i) can also be expressed mathematically by the following formula:

$$K(i)=K2(i \bmod n2)*K1(i \text{ div } n2), \text{ for } i=0 \ldots n1*n2-1$$

This corresponds to the situation where n1=n2 in the following relationship:

$$K(i)=K2(i \bmod n1)*K1(i \text{ div } n2)$$

In this case, mod denotes the integer remainder of a division, and div denotes the integer result of a division.

This is represented in graphical form by a sequence f2 which comprises repeatedly successively mapped signal sequence elements K2(k), and a sequence f1, which is mapped by an expanded signal sequence element K1(j) over the sequence f2.

The new signal sequence K(i), of length n, is obtained by multiplication of the elements in the sequence f2 by the corresponding elements in the sequence f1 which are mapped over the sequence f2. This production of a signal sequence K(i) is illustrated once again below in the figure, based on an example of two binary signal sequence elements of length 4.

The invention is not, of course, limited to signal sequence elements of length 4, or to signal sequences of length 16. The invention is also not limited to the mathematical description used above.

By way of example, the contents of the following illustration for signal sequence elements of length 16 and signal sequences of length 256 corresponds to the mathematical representation used above, and is thus likewise included in the invention:

a is a signal sequence element with a length of 16

$$a=<x1, x2, \ldots, x16>;$$

the signal sequence y of length 256 is generated by repeating the signal sequence element a 16 times, with a having a second signal sequence element of length 16 modulated onto it:

$$y=<a, a, a, \underline{a}, \underline{a}, a, \underline{a}, \underline{a}, a, a, a, \underline{a}, a, \underline{a}, a, a>$$

where the double underscore indicates the second signal sequence element and the modulation by the second signal sequence element.

The signal sequence of length 256 formed in this way can, for example, be transmitted for synchronization purposes as a primary synchronization code cp of length 256.

Signal sequences K(i) formed in this way can be used to simplify the calculation of correlation sums of these signal sequences K(i) with received signal sequences E(l).

Figure 7:
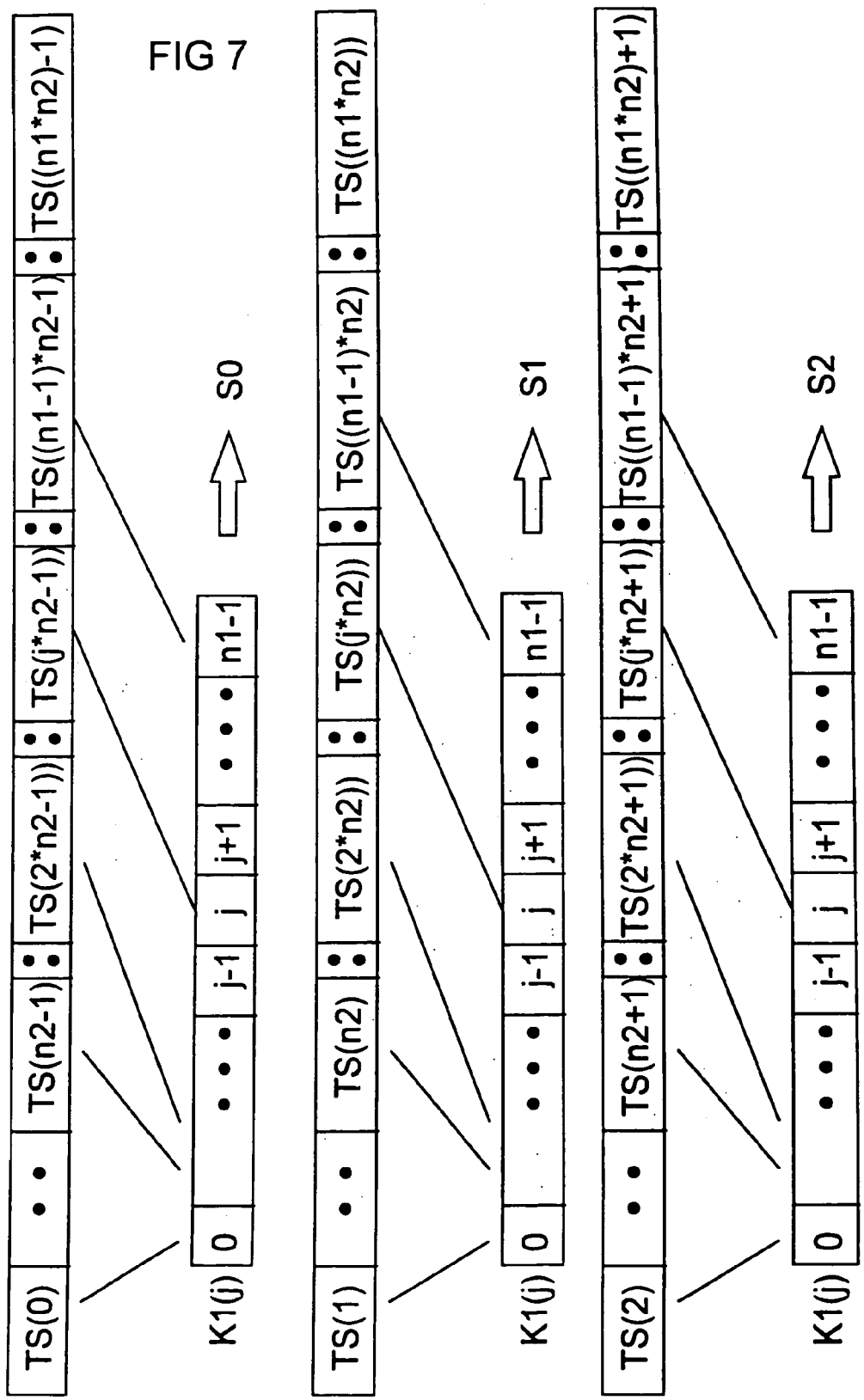
Figure 8:
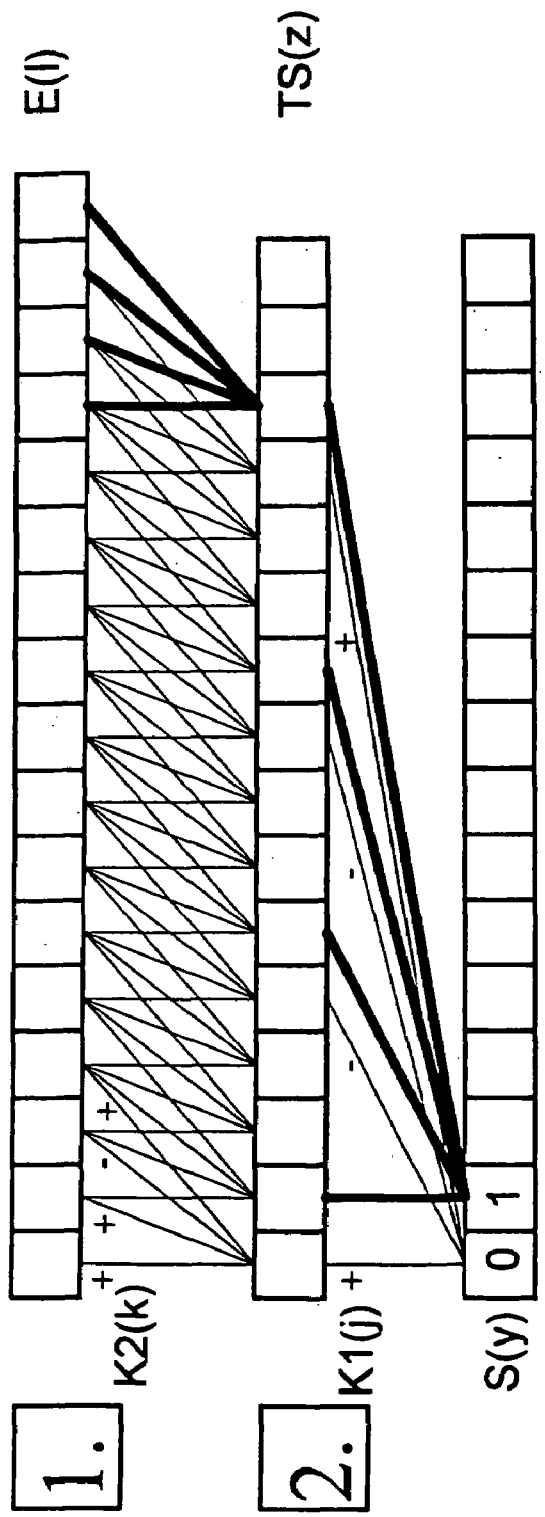

A schematic illustration of such a simplified process for calculating correlation sums S, which is thus also faster and involves less effort, is illustrated in FIGS. 6 to 8, which are referred to in the following text.

A partial correlation sum TS(z) is formed first of all. By way of example, the correlation sum of the second signal sequence element K2(k) with the corresponding section of the received signal sequence E(l) is formed for this purpose for the first element in the partial correlation sum sequence TS(0).

$$TS(0) = \begin{pmatrix} K2(0) \\ \vdots \\ K2(k) \\ \vdots \\ K2(n2-1) \end{pmatrix} * \begin{pmatrix} E(0) \\ \vdots \\ E(k) \\ \vdots \\ E(n2-1) \end{pmatrix}$$

As illustrated in graphical form, the second signal sequence element K2(k) is shifted by one element for the second element in the partial correlation sum sequence TS(1), and the correlation sum is likewise formed with the corresponding element in the received signal sequence E(l) etc.

$$TS(1) = \begin{pmatrix} K2(0) \\ \vdots \\ K2(k) \\ \vdots \\ K2(n2-1) \end{pmatrix} * \begin{pmatrix} E(1) \\ \vdots \\ E(k+1) \\ \vdots \\ E(n2) \end{pmatrix}$$

The n-th element in the partial correlation sum sequence TS(n1*n2−1, is calculated in a corresponding manner after n−1 shifts of the second signal sequence element K2(k) with respect to the received signal sequence E(l).

$$TS(n-1) = \begin{pmatrix} K2(0) \\ \vdots \\ K2(k) \\ \vdots \\ K2(n2-1) \end{pmatrix} * \begin{pmatrix} E(n-1) \\ \vdots \\ E(k+n-1) \\ \vdots \\ E(n2+n-2) \end{pmatrix}$$

The partial correlation sum sequence TS(z) produced in this way is illustrated in the upper part of FIG. 7. Each n2-th element is now selected from this partial correlation sum sequence and is multiplied in pairs by the corresponding element in the first signal sequence element K1(j).

If the selected elements in the partial correlation sum sequence TS(z) and the first signal sequence element K1(j) are respectively combined to form vectors, then the first correlation sum S0 is produced by the scalar product of these two vectors.

$$S0 = \begin{pmatrix} K1(0) \\ \vdots \\ K1(j) \\ \vdots \\ K1(n1-1) \end{pmatrix} * \begin{pmatrix} TS(0) \\ \vdots \\ TS(j*n2-1) \\ \vdots \\ TS((n1-1)*n2-1) \end{pmatrix},$$

The lower part of FIG. 7 shows the corresponding calculation for further correlation sums S1 and S2, respectively, by the selection of the n2-th elements which have been shifted by one or two places to the right from those elements which were selected first.

$$S1 = \begin{pmatrix} K1(0) \\ \vdots \\ K1(j) \\ \vdots \\ K1(n1-1) \end{pmatrix} * \begin{pmatrix} TS(1) \\ \vdots \\ TS(j*n2) \\ \vdots \\ TS(n1-1)*n2) \end{pmatrix}$$

The storage of the partial correlation sums TS once they have been calculated allows them to be referred back to when further correlation sums are calculated later, and thus makes it possible to dispense with the corresponding computation steps.

Depending on the design variant, it is either possible first of all to calculate the complete partial correlation sum sequence TS(z) over the entire received signal sequence E(l) and then to calculate the individual correlation sums, or to calculate the corresponding additionally required partial correlation sums only when required in order to calculate a new correlation sum.

FIG. 8 once again shows the method, which comprises two steps, for calculating correlation sums S, on this occasion with reference to the example, illustrated in FIG. 5, of two binary signal sequence elements of length 4.

In a first step, the partial correlation sums TS(z) of the second signal sequence element $K2(k)$ ++−+ are calculated with corresponding sections of the received signal sequence E(l) and then, in a second step, every fourth element in the partial correlation sum sequence TS(z) produced in this way is selected, is multiplied by the corresponding element in the first signal sequence element $K1(j)$ +−−+, and these are added up to form the correlation sequence S0.

The thick lines in this case represent those calculation steps which need to be carried out newly in order to calculate a further correlation sum S1 in the situation where the other partial correlation sums TS have already been calculated and stored in advance.

This design variant can be carried out using memory as efficiently as possible if every n2-th partial correlation sum is calculated first of all. The sample values are buffer stored for this purpose.

Figure 9:
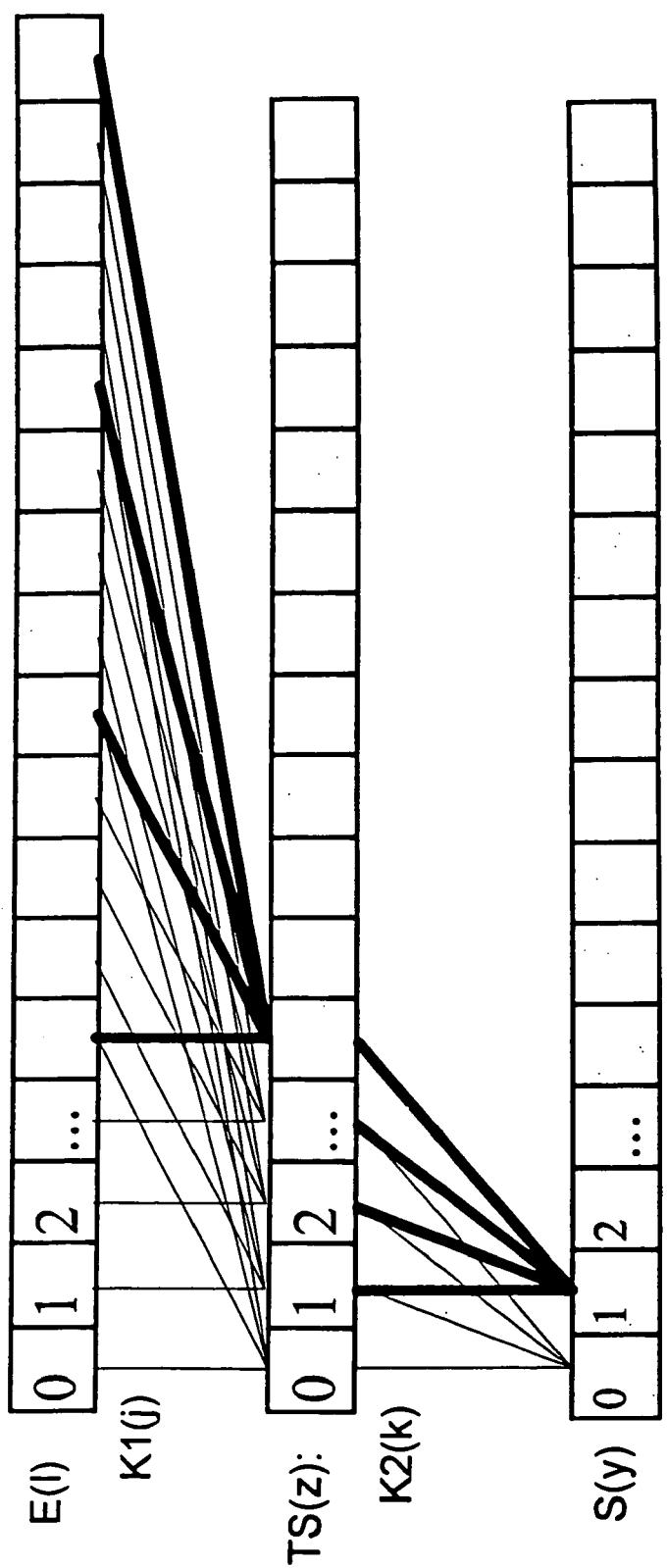

FIGS. 9 and 10 illustrate another design variant to simplify the calculation of correlation sums S on the basis of the example, already mentioned above, of two binary signal sequence elements of length 4.

In this case, every fourth element in the received signal sequence E(l) is first of all selected, and the partial correlation sum sequence TS(z) of the elements selected in this way with the signal sequence element K1 (j) is formed. Four successive elements are in each case selected from the partial correlation sum sequence TS(z) obtained in this way and are multiplied in pairs by corresponding elements in the signal sequence element $K2(k)$ and the resultant result elements are added up to form the correlation sum S. In this case, the thick lines once again represent the additionally require steps to calculate a further correlation sum S1 in the situation where the other partial correlation sums TS have already been calculated and stored in advance.

FIG. 10 once again shows the calculation of a first correlation sum S0 in which every fourth element in the received signal sequence E(l) is first of all selected, these elements are multiplied by corresponding elements in the first signal sequence element $K1(j)$ +−−+, and the partial correlation sum TS(0) is calculated by summation of the result elements. In a second step, the first four successive elements in the partial correlation sum sequence TS(z) are multiplied by the corresponding elements in the second signal sequence element $K2(k)$ ++−+, and the resultant result elements are added up to form the correlation sum S0.

In this design variant, less memory is required for buffer storage of the partial correlation sums, if the sums are calculated successively.

In one preferred design variant of the invention, Barker sequences are used as signal sequence elements since, with respect to their length, these offer best-possible autocorrelation characteristics. The use of a signal sequence of length 169 is particularly suitable for the abovementioned methods, and is formed by two Barker signal sequence elements of length 13. Such a sequence can advantageously be used in particular in a UMTS mobile radio system.

Depending on the design variant, the elements in the signal sequence elements may assume values on the unit circle, any given real values, or any given complex values.

Furthermore, a further refinement of the invention provides for two signal sequence elements of the same length to be used. It is also possible to use the same sequence for both signal sequence elements. In addition, it may be advantageous to use the mirror image of the first signal sequence element as the second signal sequence element: $K1(j)=K2(n1-j)$.

It is also possible to use a shortened signal sequence with less than n1*n2 values. In this case, the last element in the partial correlation sum sequence (for calculating a new correlation sum) is first of all calculated in shortened form in order to calculate the correlation sums, and is then calculated completely (in order to calculate the partial correlation sum sequence required for the following correlation sums). This allows the generation of signal sequences of any desired length.

Thus, using the nomenclature introduced above, a shortened signal sequence Ks(i) is used, whose length ns is less than n1*n2. ns=n1*n2−delta. n1 can be selected such that delta<n2.

The calculation is carried out analogously to the method already described, just with shortened partial correlation sequences TSs additionally being calculated, whose length is likewise delta shorter than n2.

$$TSs(n-1) = \begin{pmatrix} K2(0) \\ \vdots \\ K2(k) \\ \vdots \\ K2(n2-1-delta) \end{pmatrix} * \begin{pmatrix} E(n-1) \\ \vdots \\ E(k+n-1) \\ \vdots \\ E(n2+n-2-delta) \end{pmatrix} =$$

The (shortened) first correlation sum S0 can then be calculated with the shortened partial correlation sum being used for the last term, in contrast to the method described above.

$S0=K1(0)*TS(0)+ \ldots +K2(k)*E(k+n-1)+ \ldots +K2(n2-1\text{delta})*E(n2+n-2-\text{DELTA})$ The unshortened partial correlation sum TS(i) which will be required later is advantageously calculated using the stored partial correlation sequence TSs(i).

It is also possible to use a lengthened signal sequence, that is to say with more than n1*n2 values. In this case, the correlation sums are calculated by calculating the first part (n1*n2 terms) using the above method, with additional terms also being added. The correlation sequence K1(i) to this end contains a correlation sequence K(i) according to the invention, but lengthened by additional elements. This method once again allows the generation of sequences of any desired length.

Thus, using the nomenclature introduced above, a lengthened correlation sequence $K1(i)$ is used, whose length is n1 greater than n1*n2. Thus $K1(i)=K(i)$ for $0<=i<=n1*n2-1$.

The calculation is carried out analogously to the already described method, just with the additional terms also being calculated using any desired method, either conventionally or likewise according to the invention.

$$SO=K1(0)*TS(0)+ \ldots +K1(:)*TS(j*n2-1)*TS((n1-1)*n2-1)++K1(n1)*E(n1-1)*n2)= \ldots +K1(n1)*E(n1)$$

In a further variant of the most recently described exemplary embodiment, additional values are inserted at the start and/or between the (modulated) repetitions of the signal sequence element K2. the elements which are not inserted are then processed further using a method as above, and the inserted elements are processed further either conventionally, or likewise using a method according to the invention.

Another development of the invention envisages the use of more than two signal sequence elements, with a signal sequence element itself comprising signal sequence elements.

A further refinement of the invention makes use of the regular (virtually periodic) structure of the aperiodic autocorrelation function of this signal sequence resulting from the regular construction principle of the signal sequence K(i). This means that the search for a signal produces not only a main maximum but also secondary maxima at regular intervals. The regularity of the position of the maxima can be utilized to speed up the search for the signal sequence in the received signal sequence. As soon as a secondary maximum has been found, the position of the other maxima can be predicted on the basis of the periodicity, that is to say the correlation sum is calculated only at these points. This allows the main maximum to be detected quickly. However, the supposed secondary maximum may also just be a value which has been increased randomly (owing to the amount of noise) In this case, no maximum will actually be found at the potential points for the expected main maximum. In this case, the hypothesis is thus rejected, and the calculation is continued conventionally.

However, the regularity of the secondary maxima resulting from the construction principle of the signal sequences can also be used to eliminate and correct for interference secondary maxima in the correlation result. After detection of the maximum, the secondary maxima can be calculated from this maximum, and this value can be subtracted from the corresponding correlation results. This results in the correlation result for a (hypothetical) sequence with a perfect autocorrelation function. The regularity of the secondary maxima thus results in a highly simplified calculation.

The invention is not limited to radio transmission systems, but can also be used for other transmission methods, for example acoustic methods (ultrasound), in particular for sonography purposes, or optical methods, for example infrared measurements based on Lidar principles. One further field of application is the investigation of changes in the spectral composition of back-scattered signals.

The formation of signal sequences, their transmission and the calculation of correlation sums for these signal sequences with received signal sequences may be used in various technical fields:

for the purpose of synchronization of two transmission units, for example radio stations, in particular the use of these sequences in the synchronization channel in CDMA mobile radio systems, such as the UMTS system which is currently being standardized, in data transmission by means of transmitted symbols spread by means of the signal sequence or data in spread spectrum systems, in particular for determining transmitted symbols and data onto which such a signal form has been modulated, in instrumentation, for distance and object measurement, for establishing transmission characteristics of the transmission channel located between transmission units, such as a transmitting unit and a receiving unit, in radar technology, in order to establish the position and orientation of an object and/or further parameters which are dependent on the geometry and the specific reflection characteristics of the object, to establish transmission characteristics of the transmission channel which is located between the transmitter and receiver, in radar technology for determining parameters of a back-scattering medium, in particular the ionosphere, in particular by incoherent scattering, for establishing transmission characteristics of the transmission channel which is located between transmission units, such as a transmitting unit and receiving unit, in particular for establishing multipath propagation in instrumentation or communications technology. In this case, the way in which the propagation characteristics of the transmission channel (channel impulse response) changes with time is determined during communication by means of the correlation result. In particular, additional multipath propagation paths are determined. For this purpose, the signal sequences K (i) may also be transmitted in the form of a midamble within a radio block. This knowledge can then be used further in an otherwise conventional receiving unit.

The invention claimed is:

1. A method for synchronizing a base station to a mobile station, comprising:
   transmitting a signal sequence K(i) of length n from the base station to the mobile station in a synchronization channel, the mobile station using the signal sequence K(i) to determine a timing of the base station, the signal sequence K(i) being obtainable by:
   repeating, n1 times, a second signal sequence element K2(k) of length n2 to form a second signal sequence, the second signal sequence being modulated with first signal sequence elements K1(j) of length n1;
   wherein n1 is equal to n2, and i, j and k are integers; and
   achieving timeslot synchronization between the base station and the mobile station using the synchronization channel.

2. The method of claim 1, wherein n is equal to 256, n1 is equal to 16, and n2 is equal to 16.

3. The method of claim 1, further comprising forming the signal sequence K(i) by modulating the second signal sequence as follows: K(i)=K2 (i mod n2)*K1 (i div n2).

4. The method of claim 1, further comprising:
   receiving, at the mobile station, a received signal sequence E(l), the signal sequence K(i) being contained in the received signal sequence E(l), the signal sequence K(i) being determined in the mobile station by obtaining a correlation sum S using sections of the received signal sequence E(l);
   wherein the mobile station determines the correlation sum S by:
   determining a partial correlation sum sequence TS(z) of the second signal sequence using corresponding parts of the received signal sequence E(l);

selecting n1 elements of the partial correlation sum sequence TS(z); and multiplying selected elements of the partial correlation sum sequence TS(z) by first signal sequence elements K1($j$).

5. The method of claim 4, wherein selecting the n1 elements comprises selecting n1 in each of n2-th elements of the partial correlation sum sequence TS(z).

6. The method of claim 1, further comprising:

determining, in the mobile station, the signal sequence K(i) using information about the first signal sequence element K1($j$) and the second signal sequence element K2($k$).

7. The method of claim 6, further comprising:

receiving, at the mobile station, a received signal sequence E(l), the signal sequence K(i) being contained in the received signal sequence E(l), the signal sequence K(i) being determined in the mobile station by obtaining a correlation sums S using sections of the received signal sequence E(l);

wherein the mobile station determines the correlation sum S by:

determining a partial correlation sum sequence TS(z) for first signal sequence elements K1($j$) using selected elements of the received signal sequence E(l); and multiplying n2 elements of the partial correlation sum sequence TS(z) by second signal sequence elements K2($k$).

8. The method of claim 7, further comprising selecting n1 in each of n2-th elements of the received signal sequence E(l) in order to calculate a partial correlation sum TS.

9. The method of claim 6, further comprising:

storing partial correlation sums TS in the mobile station; and using the partial correlation sums in order to determine a further correlation sum S.

10. A base station comprising:

a transmitter to transmit a signal sequence K(i) of length n from the base station to a mobile station in a synchronization channel; and a processing device to obtain the signal sequence K(i) by repeating, n1 times, a second signal sequence element K2($k$) of length n2, the second signal sequence element K2($k$) being modulated with a first signal sequence element K1($j$) of length n1, where n1 and n2 are equal, and j and k are integers;

wherein timeslot synchronization is achieved between the base station and a mobile station using the synchronization channel.

11. A mobile station comprising:

a receiver to receive a signal sequence K(i) of length n from a base station in a synchronization channel;

wherein the signal sequence K(i) is obtained by repeating, n1 times, a second signal sequence element K2($k$) of length n2, the second signal sequence element K2($k$) being modulated with a first signal sequence element K1($j$) of length n1, where n1 and n2 are equal, and j and k are integers; and wherein timeslot synchronization is achieved between the base station and a mobile station using the synchronization channel.

12. A signal sequence K(i) of length n, the signal sequence being stored in an information carrier, the signal sequence K(i) being obtainable by:

repeating, n1 times, a second sequence element K2($k$) of length n2; and modulating a first sequence element K1($j$) of length n1 into repeated second sequence elements K2($k$);

wherein n1 is equal to n2, and i, j and k are integers;

wherein the signal sequence K(i) is usable by a mobile station to determine a timing of the base station; and wherein timeslot synchronization is achievable between the base station and the mobile station using the signal sequence K(i) transmitted over a synchronization channel.

* * * * *

UNITED STATES PATENT AND TRADEMARK OFFICE
CERTIFICATE OF CORRECTION

PATENT NO. : 7,142,584 B1  Page 1 of 1
APPLICATION NO. : 09/786738
DATED : November 28, 2006
INVENTOR(S) : Leopold Bömer It is certified that error appears in the above-identified patent and that said Letters Patent is hereby corrected as shown below:

Title Page (Title), item (54):

Delete "BASH" and Insert -- BASE --

Title Page, item (56); Col. 2 (Other Publications), Line 2:

Delete "Transaction" and Insert -- Transactions --

Column 1, Line 1 (Title):

Delete "BASH" and Insert -- BASE --

Signed and Sealed this

Seventh Day of October, 2008

JON W. DUDAS
*Director of the United States Patent and Trademark Office*